United States Patent [19]

Itoh et al.

[11] Patent Number: 4,771,099

[45] Date of Patent: Sep. 13, 1988

[54] SILICONE RUBBER COMPOSITION

[75] Inventors: Kunio Itoh; Takeo Yoshida; Masaharu Takahashi, all of Annaka, Japan

[73] Assignee: Shin-Etsu Chemical Co., Ltd., Tokyo, Japan

[21] Appl. No.: 121,226

[22] Filed: Nov. 16, 1987

[30] Foreign Application Priority Data

Nov. 20, 1986 [JP] Japan ................................. 61-277730

[51] Int. Cl.$^4$ ......................... C08L 83/04; C08G 77/06
[52] U.S. Cl. .................................... 524/862; 524/860; 528/24
[58] Field of Search ............................. 528/24, 31, 32; 524/860, 862; 525/386, 387

[56] References Cited

U.S. PATENT DOCUMENTS

| | | | |
|---|---|---|---|
| 3,313,762 | 4/1967 | Pfeifer ..................... | 528/24 |
| 3,725,455 | 4/1973 | D'Angelo et al. ............ | 528/24 |
| 4,061,704 | 12/1977 | Barter ..................... | 528/24 |
| 4,329,275 | 5/1982 | Hatanaka et al. ............ | 528/24 |
| 4,335,035 | 6/1982 | Hatanaka et al. ............ | 528/24 |

FOREIGN PATENT DOCUMENTS 23807 2/1983 Japan .

*Primary Examiner*—John C. Bleutge
*Assistant Examiner*—Ralph H. Dean, Jr.
*Attorney, Agent, or Firm*—Wyatt, Gerber, Shoup and Badie

[57] ABSTRACT

The silicone rubber composition of the invention comprises, as the peroxide curing agent, a neopentane diol derivative represented by the general formula

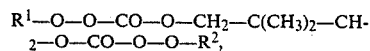

$$R^1\text{—O—O—CO—O—CH}_2\text{—C(CH}_3)_2\text{—CH}_2\text{—O—CO—O—O—R}^2,$$

in which $R^1$ and $R^2$ are each, independently from the other, a monovalent hydrocarbon group having 3 to 10 carbon atoms or a silyl group of the general formula —SiR$^3{}_3$, R$^3$ being a methyl, ethyl or phenyl group, such as trimethyl silyl, in admixture with a diorganopolysiloxane and a reinforcing silica filler. By virtue of this unique formulation, the silicone rubber composition is suitable for hot-air vulcanization without compression as in the vulcanization process by extrusion molding followed by heating in a hot-air oven.

10 Claims, No Drawings

SILICONE RUBBER COMPOSITION

BACKGROUND OF THE INVENTION

The present invention relates to a silicone rubber composition or, more particularly, to a silicone rubber composition capable of being cured by hot-air vulcanization under normal pressure to give a cured silicone rubber having no problems in respect of voids and surface tackiness as well as adverse influences against human body and useful as a material of extrusion molding to prepare highly heat-resistant and electrically insulating electric wire insulation along with transparency. The invention also relates to a cured silicone rubber article which is a vulcanizate of the above mentioned novel silicone rubber composition.

As is well known, silicone rubbers in general have excellent heat and cold resistance and electric properties so that they are widely used in a variety of applications. Silicone rubbers are shaped and cured into cured rubber products by several different processes depending on the type of the rubber composition and the characteristics required in the cured products.

Among several methods for curing silicone rubber compositions, the most conventional is that a silicone rubber composition admixed with an organic peroxide is heated at an elevated temperature. Various organic peroxides have been proposed and practically used as a curing agent of silicone rubber compositions including, for example, benzoyl peroxide, 4-chlorobenzoyl peroxide, 2,4-dichlorobenzoyl peroxide, dicumyl peroxide, di-tert-butyl peroxide, 2,5-dimethyl-2,5-di(tert-butylperoxy) hexane, tert-butyl perbenzoate, tert-butyl cumyl peroxide and the like. The curing process of a silicone rubber composition formulated with these organic peroxides must be performed under pressure in order to avoid occurrence of voids in the cured rubber body or blistering on the surface.

It is sometimes desirable that curing of a silicone rubber composition can be performed under normal pressure in a hot-air oven as in the fabrication of extrusion-molded rubber articles such as tubes, sheets, insulation of electric wires and the like. None of the above named organic peroxides is suitable as a curing agent in such a process of hot-air vulcanization of silicone rubber compositions excepting 2,4-dichlorobenzoyl peroxide. This particular organic peroxide as a chlorine-containing compound, however, has disadvantages of corrosiveness against metals and adverse influence against human body by the decomposition products thereof. Moreover, cured silicone rubber products obtained by use of this organic peroxide are also not satisfactory in respect of the relatively low heat resistance under a hermetically sealed condition and large permanent compression set.

U.S. Pat. No. 4,061,704 discloses several tert-alkylperoxy alkyl carbonates which can be used as a curing agent of a silicone rubber composition without the above mentioned problems and disadvantages including tert-butylperoxy octadecyl carbonate, tert-amylperoxy-2,6,8-trimethyl-4-nonyl carbonate, tert-amylperoxy octadecyl carbonate and the like. The activity of these carbonate-type peroxides as a curing agent of silicone rubbers, however, is relatively low so that full curing of a silicone rubber composition can hardly be obtained by using the peroxide of this type alone in addition to a problem that the decomposition products of these peroxides are compounds having a relatively large molecular weight and can hardly be dissipated from the cured silicone rubber products to badly affect the heat resistance of the rubber products.

An alternative type of silicone rubber compositions suitable for hot-air vulcanization under normal pressure includes the so-called addition reaction-type silicone rubber compositions which utilize the hydrosilation reaction taking place between an organopolysiloxane having aliphatically unsaturated groups such as vinyl and an organohydrogenpolysiloxane having hydrogen atoms directly bonded to the silicon atoms in the presence of a platinum catalyst. As compared to the peroxidecurable silicone rubber compositions, the applicability of the silicone rubber compositions of this type is limited to several special fields wtihout versatility because of the short pot life or shelf life readily to cause scorching.

Further, several organic peroxides have recently been proposed as a curing agent of silicone rubber compositions including bis(2-methylbenzoyl) peroxide disclosed in Japanese Patent Kokai No. 59-18758, bis(-dimethylbenzoyl) peroxides disclosed in Japanese Patent Kokai No. 60-16968, bis(trimethylbenzoyl) peroxides disclosed in Japanese Patent Kokai No. 60-163860 and bis(2-methoxybenzoyl) peroxide disclosed in Japanese Patent Kokai No. 59-232145. These bis(substituted benzoyl) peroxides are indeed effective to solve the problems due to blooming of the decomposition products on the surface of the cured rubber products and the problems in safety and hygiene. A problem in the use of these peroxides is the relatively strong surface tackiness of the silicone rubber products cured by the hot-air vulcanization using the same. Moreover, silicone rubber products cured by using these peroxides can be imparted with an absorbance of ultraviolet light at a wavelength of 220 nm decreased to 0.3 or smaller in the ultraviolet transmission test undertaken for medical implement only when the hot-air vulcanization is followed by a lengthy post-curing treatment.

SUMMARY OF THE INVENTION

Accordingly, the present invention has an object to provide a novel silicone rubber composition capable of being cured by the hot-air vulcanization under normal pressure without the above described problems and disadvantages.

Thus, the silicone rubber composition of the present invention comprises:

(A) 100 parts by weight of an organopolysiloxane represented by the average unit formula

$$R_a SiO_{(4-a)/2}, \quad (I)$$

in which R is a monovalent hydrocarbon group and the subscript a is a positive number in the range from 1.90 to 2.05, and having an average degree of polymerization of at least 100;

(B) from 5 to 100 parts by weight of a finely divided silica filler; and (C) from 0.1 to 5 parts by weight of a neopentane diol diester represented by the general formula

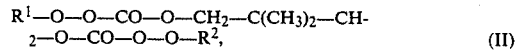

$$R^1-O-O-CO-O-CH_2-C(CH_3)_2-CH_2-O-CO-O-O-R^2, \quad (II)$$

in which $R^1$ and $R^2$ are each, independently from the other, a monovalent hydrocarbon group having 3 to 10 carbon atoms or a silyl group of the general formula —SiR$^3{}_3$, R$^3$ being a methyl, ethyl or phenyl group.

The above defined inventive silicone rubber composition may optionally comprise:

(D) up to 10 parts by weight, per 100 parts by weight of the component (A), of an organosilicon compound having at least one hydrogen atom directly bonded to the silicon atom in a molecule.

DETAILED DESCRIPTION OF THE PREFERRED EMBODIMENTS

As is understood from the above given summary of the invention, the most characteristic ingredient in the inventive silicone rubber composition is the component (C). The components (A) and (B) are rather conventional. By virtue of this unique formulation of the composition, the inventive silicone rubber composition is quite free from the above described problems and disadvantages encountered in the hot-air vulcanization of conventional silicone rubber compositions and capable of giving excellent cured silicone rubber products by the hot-air vulcanization.

The component (A) is the base ingredient of the inventive silicone rubber composition and is an organopolysiloxane represented by the above given average unit formula (I). In the formula, the symbol R denotes a monovalent hydrocarbon group selected from the class consisting of alkyl groups, e.g., methyl, ethyl, propyl and butyl groups, alkenyl groups, e.g., vinyl and allyl groups, and aryl groups, e.g., phenyl and tolyl groups as well as those substituted groups, e.g., chloromethyl, chloropropyl, 3,3,3-trifluoropropyl and 2-cyanoethyl groups, obtained by replacing a part or all of the hydrogen atoms in the above named hydrocarbon groups with substituents such as halogen atoms, cyano groups and the like. The subscript a is a positive number in the range from 1.90 to 2.05. This limitation means that the organopolysiloxane is a diorganopolysiloxane having a substantially linear molecular structure although a small number of branches attached to the linear molecular chain may have no particular adverse influences. Each of the molecular chain ends should be terminated with a silanolic hydroxy group or a triorganosilyl group which is exemplified by trimethyl silyl, dimethyl vinyl silyl, methyl phenyl vinyl silyl, methyl diphenyl silyl, methyl divinyl silyl and trivinyl silyl groups. Preferably, the triorganosilyl group as the terminal group should have two or three vinyl groups bonded to the same silicon atom in order to further decrease the surface tackiness of the cured silicone rubber product prepared from the composition. The average degree of polymerization of the organopolysiloxane is not particularly limitative but should be at least 100 or, preferably, at least 1000 so that the organopolysiloxane may have a viscosity of at least 300 centistokes at 25°. When the degree of polymerization of the organopolysiloxane is too small, the silicone rubber products obtained by curing the composition may have no satisfactory mechanical properties as a rubber.

The component (B) in the inventive silicone rubber composition is a finely divided silica filler which may be any of known ones conventionally used in silicone rubber compositions as a reinforcing filler, thickener, extender, workability improver and the like including fumed silica and precipitated silica, optionally, having hydrophobicity on the surface imparted by a treatment, finely pulverized quartz, diatomaceous earth and the like. The silica filler should preferably have a specific surface area of at least 1 m$^2$/g. The amount of the silica filler as the component (B) should be in the range from 5 to 100 parts by weight or, preferably, from 20 to 80 parts by weight per 100 parts by weight of the component (A). When the amount of the silica filler is too small, the desired reinforcing effect cannot be exhibited to a full extent along with poor workability of the composition. When the amount of the silica filler is too large, on the other hand, difficulties are encountered in the compounding works of the filler with the organopolysiloxane or the silicone rubber composition compounded with a so large amount of the filler may have extremely poor workability, e.g., moldability in extrusion along with decreased heat resistance of the cured silicone rubber which is essential when the silicone rubber is used for the insulation of electric wires.

The component (C) is an organic peroxide containing no halogen atoms which acts as a curing agent of the organopolysiloxane. It is a diester compound of neopentane diol represented by the above given general formula (II). The symbols R$^1$ and R$^2$ in the formula each denote, independently from the other, a monovalent hydrocarbon group having 3 to 10 carbon atoms selected from the class consisting of n-propyl, isopropyl, tert-butyl, n-butyl, n-amyl, tert-amyl, hexyl, heptyl, octyl, 2-ethylpropyl, 2-ethylbutyl, 2-ethylhexyl and cumyl groups, or a triorganosilyl group of the formula -SiR$^3{}_3$, in which R$^3$ is methyl, ethyl or phenyl group, selected from the class consisting of trimethyl silyl, triethyl silyl and triphenyl silyl groups. Since no halogen atoms are contained in this compound, the curing agent is absolutely free from the problems due to the halogen-containing decomposition products of the compound when it is used as a curing agent of the silicone rubber composition.

The amount of the peroxide as the component (C) in the inventive silicone rubber composition should be in the range from 0.1 to 5 parts by weight per 100 parts by weight of the component (A). When the amount thereof is too small, fully cured silicone rubber products having excellent properties cannot be obtained from the composition. When the amount thereof is too large, on the other hand, certain adverse influences are caused by the decomposition products of the peroxide remaining in the cured silicone rubber products if not to mention the economical disadvantage due to increase in the costs.

The peroxide as the component (C) can be synthesized in a manner similar to the preparation of various peroxy monocarbonates. For example, 2 moles of a potassium salt of a tertiaryhydrocarbyl hydroperoxide of the formula R$^1$CMe$_2$-OOK, in which Me is a methyl group and R$^1$ has the same meaning as defined before, are reacted with a mole of 2,2-dimethylpropane-1,3-dichloroformate of the formula ClCO—O—CH$_2$—CMe$_2$—CH$_2$—O—COCl in an aqueous solution of potassium hydroxide according to the reaction equation 2R$^1$CMe$_2$—OOK+ClCO—O—CH$_2$—CMe$_2$—CH$_2$—O—COCl=R$^1$CMe$_2$—OO—CO—O—CH$_2$—CMe$_2$—O—CO—OO—CMe$_2$ R$^1$+2KCl.

The tertiary-hydrocarbyl hydroperoxide suitable for the reaction is exemplified by tert-hexyl hydroperoxide, 1,1,3,3-tetramethylbutyl hydroperoxide, cumyl hydroperoxide, p-menthane hydroperoxide, p-isopropyl cumyl hydroperoxide, m-isopropyl cumyl hydroperoxide and the like. The reaction should be performed at a temperature in the range from −5° C. to 35° C. or, preferably, from 10° C. to 20° C. so that the reaction is complete within 3 hours or, mostly, within 2 hours. The molar ratio of the starting dichloroformate and the hydroperoxide in the reaction mixture should be in the range of 1:2 to 4 or, preferably, in the range of 1:2.2 to 2.8 and the concentration of the aqueous solution of potassium hydroxide should be in the range from 5 to 30% by weight or, preferably, from 15 to 25% by weight.

The component (D), which is optional in the inventive silicone rubber composition, is an organosilicon compound having at least one hydrogen atom directly bonded to the silicon atom in a molecule. Formulation of this component in the inventive composition is effective to further decrease the surface tackiness of the cured silicone rubber products obtained from the inventive silicone rubber composition by the hot-air vulcanization. The organosilicon compound should preferably be polymeric having a linear or cyclic molecular structure although small amounts of branched and three-dimensional structures may have no particularly adverse influences. The degree of polymerization of the polymeric compound is not particularly limitative. Typically, the organosilicon compound is exemplified by methyl hydrogen polysiloxanes terminated at each molecular chain end with a trialkyl silyl group, tetrakis(dimethylsiloxy) silane, copolymeric organopolysiloxanes composed of tetrafunctional $SiO_2$ units and monofunctional $(CH_3)_2HSiO_{0.5}$ units, copolymeric organopolysiloxanes composed of methyl hydrogen siloxane units and dimethyl siloxane units, poly(silalkylenesiloxanes), polysilanes and polycarbosilanes having silicon-bonded hydrogen atoms and the like. When the component (D) is used in the formulation of the inventive silicone rubber composition with an above mentioned object, the amount thereof should be at least 0.05 part by weight but should not exceed 10 parts by weight or, preferably, 5 parts by weight per 100 parts by weight of the component (A). When the amount thereof is too small, no substantial improvement can be obtained in the surface tackiness of the cured silicone rubber products. When the amount thereof is too large, on the other hand, the cured silicone rubber products of the composition may have somewhat decreased electric properties and heat resistance.

The silicone rubber composition of the invention can be obtained by uniformly compounding the above described components (A), (B), (C) and, optionally, (D) each in the defined amount. The compounding works of these components can be performed in any convenient order without particular limitations. It is usual that the organopolysiloxane as the component (A) and the silica filler as the component (B) are first compounded into a uniform mass or base compound which is then admixed and kneaded with the organic peroxide as the component (C) and, optionally, the organosilicon compound as the component (D) using a suitable rubber blending machine such as a mixing roller.

It is of course optional that the thus prepared silicone rubber composition of the invention is further admixed with various kinds of additives conventionally used in silicone rubber compositions including, for example, dispersion aids such as low-molecular organopolysiloxanes having a degree of polymerization of 20 or smaller, organosilanes having a silanol group, alkoxy-containing organosilane compounds and the like, heat-resistance improvers such as iron oxide, ceric oxide, iron octoate and the like, coloring agents, e.g., pigments, and so on.

The silicone rubber composition of the invention prepared in the above described manner can be cured into a rubbery elastomer by heating in a hot-air oven even under normal pressure as being extruded out of an extruder machine. Curing of the inventive composition is usually complete by heating at a temperature of 200° to 500° C. for a length of time of 5 seconds to 10 minutes. If necessary, combined use of an infrared heater is effective to accelerate curing of the composition by the hot-air vulcanization in an oven. The silicone rubber product obtained from the inventive composition is advantageously free from any voids within the body and blistering and tackiness on the surface and has excellent heat resistance. Accordingly, the inventive silicone rubber composition is useful for insulation of electric wires and molding of tubes and sheets employed in medical and foodstuff uses.

In the following, the silicone rubber composition of the invention is described in more detail by way of examples and comparative examples, in which the term "parts" refers to "parts by weight" and the values of the viscosity are all those obtained by the measurement at 25° C.

EXAMPLES 1 AND 2 AND COMPARATIVE EXAMPLES 1 TO 3

A base compound was prepared by uniformly blending 100 parts of an organopolysiloxane having a viscosity of 10,000,000 centistokes and composed of 99.725% by moles of dimethyl siloxane units $(CH_3)_2SiO$, 0.25% by moles of methyl vinyl siloxane units $(CH_2=CH)(CH_3)SiO$ and 0.025% by moles of vinyl dimethyl siloxy units $(CH_2=CH)(CH_3)_2SiO_{0.5}$ as the terminal groups, 40 parts of a fumed silica filler (Aerosil 200, a product by Nippon Aerosil Co.) and 4 parts of diphenyl silane diol as a dispersing aid followed by a heat treatment at 150° C. for 4 hours in an oven and mastication and plasticization on a two-roller mill.

The base compound was then admixed with a different kind of anorganic peroxide indicated below in an amount shown in Table 1 together with or without 0.5 part of a methyl hydrogen polysiloxane containing 1.6 mols/100 g of silicon-bonded hydrogen atoms and terminated at each molecular chain end with a trimethyl silyl group, which is referred to as the H-siloxane I hereinbelow, and thoroughly kneaded on a two-roller mill to give a curable silicone rubber composition.

Organic peroxide A: a 50:50 by weight mixture of a dimethyl silicone fluid having a viscosity of 10,000 centistokes and an organic peroxide expressed by the structural formula

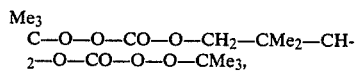

in which Me is a methyl group.

Organic peroxide B: a 50:50 by weight mixture of the same dimethyl silicon fluid as above and 2,4-dichlorobenzoyl peroxide Organic peroxide C: a 50:50 by weight mixture of the same dimethyl silicone fluid as above and tert-butylperoxy octadecyl carbonate The thus prepared silicone rubber compositions were each extruded to form an insulation layer of 1 mm thickness on a tin-plated annealed copper wire of 4.0 mm diameter as a core and then subjected to hot-air vulcanization by passing through a hot-air oven at 400° C. at such a velocity that the staying time of the rubber composition therein was 15 seconds. The thus cured insulation layer of the silicone rubber was evaluated for the surface tackiness as vulcanized and the hardness before and after a heating test at 200° C. for 3 days in a hermetically sealed condition in a glass ampule. The results are shown in Table 1, in which the ratings of the surface tackiness A, B, C and D were given according to the following criteria.

A: absolutely no tackiness
B: very little but recognizable tackiness
C: clearly recognizable tackiness
D: strong tackiness

TABLE 1

| | Example | | Comparative Example | | |
|---|---|---|---|---|---|
| | 1 | 2 | 1 | 2 | 3 |
| H—siloxane I | no | yes | no | no | yes |
| Organic       A | 1.9 | 1.9 | — | — | — |
| peroxide,     B | — | — | 1.5 | — | — |
| parts         C | — | — | — | 2 | 2 |
| Surface tackiness | B | A | B | D | C |
| Hardness  as cured | 62 | 61 | 60 | 48 | 50 |
| after | 56 | 57 | 43 | 38 | 41 |
| heating | (−6) | (−4) | (−17) | (−10) | (−9) |

EXAMPLES 3 TO 5

The experimental procedure in each of these Examples was substantially the same as in Example 2 except that the H-siloxane I was replaced with another methyl hydrogen polysiloxane, referred to as the H-siloxane II hereinbelow, having a viscosity of 18 centistokes and composed of 50% by moles of methyl hydrogen siloxane units $(CH_3)HSiO$, 45% by moles of dimethyl siloxane units $(CH_3)_2SiO$ and 5% by moles of tetrafunctional siloxane units $SiO_2$ in an amount indicated in Table 2 below and that the amount of the organic peroxide A was decreased from 1.9 parts to 1.5 parts. The cured silicone rubbers were examined for the surface tackiness and insulation resistance according to the procedure specified in JIS C 3004-1975 to give the results shown in Table 2. It was found that the amount 15 parts of the H-siloxane II was undesirable due to the decreased insulation resistance.

TABLE 2

| | Example | | |
|---|---|---|---|
| | 3 | 4 | 5 |
| H—siloxane II, parts | 0 | 1 | 15 |
| Surface tackiness | B | A | A |
| Insulation resistance, megaohm | 3,500 | 3,460 | 1,250 |

EXAMPLES 6 AND 7

A base compound was prepared by uniformly blending 100 parts of an organopolysiloxane gum having an average degree of polymerization of 6,000 and composed of 99.8% by moles of dimethyl siloxane units $(CH_3)_2SiO$ and 0.2% by moles of methyl vinyl siloxane units $(CH_2=CH)(CH_3)SiO$ and terminated at each molecular chain end with a methyl divinyl silyl group, 40 parts of a fumed silica filler (Aerosil 200, supra), 10 parts of dimethyl polysiloxane fluid terminated at each molecular chain end with a silanol group having an average degree of polymerization of 8 and 0.3 part of vinyl trimethoxy silane followed by a heat treatment at 150° C. for 4 hours in an oven.

In Example 6, the base compound was then admixed with 2.0 parts of methyl hydrogensiloxane expressed by the structural formula

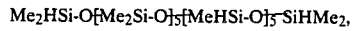
Me$_2$HSi-O[Me$_2$Si-O]$_5$[MeHSi-O]$_5$SiHMe$_2$, 2.5 parts of 50:50 parts by weight mixture of a peroxide expressed by the structural formula

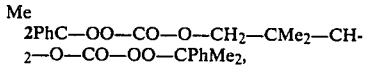
Me
2PhC—OO—CO—O—CH$_2$—CMe$_2$—CH$_2$—O—CO—OO—CPhMe$_2$, in which pH denotes a phenyl group, and a silicone fluid.

The formulation of the composition in Example 7 was the same as above excepting replacement of the methyl hydrogenpolysiloxane with 1.0 part of a paste prepared by mixing calcium hydroxide and a silicone fluid in a 50:50 by weight ratio.

The silicone rubber compositions were each extruded using an extruder machine to form a tube having an inner diameter of 5 mm and the outer diameter of 9 mm and then subjected to hot-air vulcanization at a temperature of 300° C. for 60 seconds followed by post-vulcanization at a temperature of 180° C. for 4 hours. The thus cured silicone rubber tubes had a tensile strength of 90 kg/cm$^2$ or 88 kg/cm$^2$ in Examples 6 and 7, respectively, with absolutely no surface tackiness. While the silicone rubber tube prepared in Example 6 had good transparency, the tube prepared in Example 7 was cloudy.

EXAMPLE 8

The formulation of the silicone rubber composition was substantially the same as in Example 2 except that the terminal group at the molecular chain end of the organopolysiloxane as the component (A) was a trivinyl silyl group of the formula $(CH_2=CH)_3Si$— instead of the vinyl dimethyl silyl group, the organic peroxide in Example 2 was replaced with an organosilicon-containing peroxide expressed by the structural formula

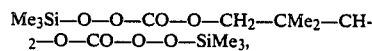
Me$_3$Si—O—O—CO—O—CH$_2$—CMe$_2$—CH$_2$—O—CO—O—O—SiMe$_3$, in which Me is a methyl group, and the amount of the 50:50 by weight mixture of the peroxide and a silicone fluid was 2.0 parts instead of 1.9 parts.

The silicone rubber composition was extruded using a 400 mm extruder machine to form an insulation layer of 1 mm thickness of a tin-plated annealed copper wire of 3 mm diameter as core and then subjected to hot-air vulcanization at 400° C. by passing through a hot-air oven at such a velocity that the staying time of the rubber composition in the oven was 15 seconds. The thus obtained insulation layer of cured silicone rubber had no surface tackiness and a hardness of 62 as cured and 59 after aging at 200° C. for 3 days as sealed in a glass ampule.

What is claimed is:
1. A silicone rubber composition which comprises:
(A) 100 parts by weight of an organopolysiloxane represented by the average unit formula

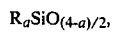
$R_aSiO_{(4-a)/2}$, in which R is a monovalent hydrocarbon group and the subscript a is a positive number in the range from 1.90 to 2.05, and having an average degree of polymerization of at least 100;

(B) from 5 to 100 parts by weight of a finely divided silica filler; and (C) from 0.1 to 5 parts by weight of a neopentane diol diester represented by the general formula

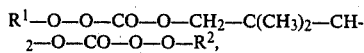
$R^1$—O—O—CO—O—CH$_2$—C(CH$_3$)$_2$—CH$_2$—O—CO—O—O—$R^2$, in which $R^1$ and $R^2$ are each, independently from the other, a monovalent hydrocarbon group having 3 to 10 carbon atoms or a silyl group of the general formula —SiR$^3$$_3$, $R^3$ being a methyl, ethyl or phenyl group.

2. The silicone rubber composition as claimed in claim 1 which further comprises:

(D) up to 10 parts by weight, per 100 parts by weight of the component (A), of an organosilicon compound having at least one hydrogen atom directly bonded to the silicon atom in a molecule.

3. The silicone rubber composition as claimed in claim 1 wherein the component (C) is a compound expressed by the structural formula

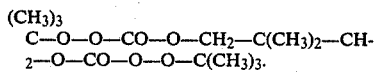
(CH$_3$)$_3$C—O—O—CO—O—CH$_2$—C(CH$_3$)$_2$—CH$_2$—O—CO—O—O—C(CH$_3$)$_3$.

4. The silicone rubber composition as claimed in claim 1 wherein the component (C) is a compound expressed by the structural formula (C$_6$H$_5$)(CH$_3$)$_2$C—O—O—CO—O—CH$_2$—C(CH$_3$)$_2$—CH$_2$—O—CO—O—O—C(CH$_3$)$_2$(C$_6$H$_5$).

5. The silicone rubber composition as claimed in claim 1 wherein the component (C) is a compound expressed by the structural formula

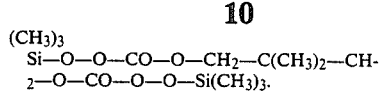
(CH$_3$)$_3$Si—O—O—CO—O—CH$_2$—C(CH$_3$)$_2$—CH$_2$—O—CO—O—O—Si(CH$_3$)$_3$.

6. The silicone rubber composition a claimed in claim 1 wherein the organopolysiloxane as the component (A) is a diorganopolysiloxane having a linear molecular structure terminated at each molecular chain end with a silyl group having two or three vinyl groups bonded to the silicon atom.

7. The silicone rubber composition as claimed in claim 1 wherein the organopolysiloxane as the component (A) is a diorganopolysiloxane having a viscosity of at least 300 centistokes at 25° C.

8. The silicone rubber composition as claimed in claim 2 wherein the organosilicon compound as the component (D) is a methyl hydrogen polysiloxane.

9. The silicone rubber composition as claimed in claim 2 wherein the amount of the organosilicon compound as the component (D) is in the range from 0.05 to 5 parts by weight per 100 parts by weight of the component (A).

10. A cured silicone rubber article which is a vulcanizate of a silicone rubber composition comprising:

(A) 100 parts by weight of an organopolysiloxane represented by the average unit formula $R_aSiO_{(4-a)/2}$, in which R is a monovalent hydrocarbon group and the subscript a is a positive number in the range from 1.90 to 2.05, and having an average degree of polymerization of at least 100;

(B) from 5 to 100 parts by weight of a finely divided silica filler; and (C) from 0.1 to 5 parts by weight of a neopentanediol diester represented by the general formula $R^1$—O—O—CO—O—CH$_2$—C(CH$_3$)$_2$—CH$_2$—O—CO—O—O—$R^2$, in which $R^1$ and $R^2$ are each, independently from the other, a monovalent hydrocarbon group having 3 to 10 carbon atoms or a silyl group of the general formula —SiR$^3$$_3$, $R^3$ being a methyl, ethyl or phenyl group.

* * * * *